(12) United States Patent
Naik

(10) Patent No.: US 6,870,342 B2
(45) Date of Patent: Mar. 22, 2005

(54) COSINE BANG-BANG SEEK CONTROL FOR A VOICE COIL OF A DISC DRIVE

(75) Inventor: Apurva Dolatrai Naik, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/678,818

(22) Filed: Oct. 3, 2003

(65) Prior Publication Data

US 2004/0066158 A1 Apr. 8, 2004

Related U.S. Application Data

(60) Provisional application No. 60/415,836, filed on Oct. 3, 2002.

(51) Int. Cl.$^7$ .............................................. G05B 13/04
(52) U.S. Cl. ................................... 318/561; 360/78.09
(58) Field of Search ................................ 318/561, 567, 318/568.1, 611; 360/75, 78.01, 78.04, 78.06, 78.07, 78.08, 78.09

(56) References Cited

U.S. PATENT DOCUMENTS

| | | | |
|---|---|---|---|
| 4,796,112 A | * 1/1989 | Mizukami et al. | 360/78.07 |
| 5,111,349 A | * 5/1992 | Moon | 360/78.07 |
| 5,254,920 A | * 10/1993 | Agarwal et al. | 318/560 |
| 5,465,035 A | * 11/1995 | Scaramuzzo et al. | 318/561 |
| 5,847,895 A | 12/1998 | Romano et al. | |
| 5,974,007 A | 10/1999 | Getreuer | |
| 6,031,684 A | 2/2000 | Gregg | |
| 6,347,018 B1 | 2/2002 | Kadlec et al. | |
| 6,441,988 B2 | 8/2002 | Kang et al. | |
| 6,490,120 B1 | 12/2002 | Burton et al. | |
| 6,501,613 B1 | 12/2002 | Shih | |
| 6,549,364 B1 | * 4/2003 | Shih | 360/78.06 |
| 6,686,716 B1 | * 2/2004 | Predina et al. | 318/560 |

FOREIGN PATENT DOCUMENTS

| | | |
|---|---|---|
| JP | 10-143879 | 5/1998 |
| JP | 11-250597 | 9/1999 |

* cited by examiner

*Primary Examiner*—Bentsu Ro
(74) *Attorney, Agent, or Firm*—David K. Lucente; Derek J. Berger

(57) ABSTRACT

A method and apparatus for improving the timing of a seek operation through the removal of the coast phase of conventional model reference waveform type control systems are provided. With the apparatus and method, the coast phase is removed such that an acceleration phase is immediately followed by a deceleration phase in the waveform of the control system. A (1-Cos)/2 shaping is applied to the resulting square waveform so that the affects of high frequency harmonics are minimized. The resulting "cosine bang-bang" waveform provides a reduction in seek time when compared to conventional model reference waveform based control. In addition to the above, the present invention provides a controller architecture in which the cosine bang-bang waveform may be applied to a voice coil motor to control the actuation of the read/write heads of a disc drive. With this controller architecture, the low-pass filters required in a model reference waveform approach are eliminated in favor of (1-Cos)/2 shaping of the square waveform of the present invention. As a result, the increased time requirement due to low pass filtering is eliminated in the controller of the present invention.

20 Claims, 5 Drawing Sheets

COSINE BANG-BANG SEEK CONTROL FOR A VOICE COIL OF A DISC DRIVE

RELATED APPLICATIONS

This application claims priority to U.S. Provisional Application No. 60/415,836 filed Oct. 3, 2002, entitled Cosine Bang-Bang Seeks.

FIELD OF THE INVENTION

The present invention relates generally to the field of voice coil control in a disc drive. More particularly, the present invention relates to an apparatus and method for performing cosine bang-bang seek control of a voice coil of a disc drive so as to reduce the amount of time required for the seek operation.

BACKGROUND OF THE INVENTION

Disc drives are commonly used in workstations, personal computers, laptops and other computer systems to store large amounts of data in a form that can be made readily available to a user. In general, a disc drive comprises a magnetic disc that is rotated by a spindle motor. The surface of the disc is divided into a series of data tracks. The data tracks are spaced radially from one another across a band having an inner diameter and an outer diameter.

Each of the data tracks extends generally circumferentially around the disc and can store data in the form of magnetic transitions within the radial extent of the track on the disc surface. An interactive element, such as a magnetic transducer, is used to sense the magnetic transitions to read data, or to transmit an electric signal that causes a magnetic transition on the disc surface, to write data. The magnetic transducer includes a read/write gap that contains the active elements of the transducer at a position suitable for interaction with the magnetic surface of the disc. The radial dimension of the gap fits within the radial extent of the data track containing the transitions so that only transitions of the single track are transduced by the interactive element when the interactive element is properly centered over the respective data track.

The magnetic transducer is mounted by a head structure to a rotary actuator arm and is selectively positioned by the actuator arm over a preselected data track of the disc to either read data from or write data to the preselected data track of the disc, as the disc rotates below the transducer. The actuator arm is, in turn, mounted to a voice coil motor that can be controlled to move the actuator arm across the disc surface.

A servo system is typically used to control the position of the actuator arm to insure that the head is properly centered over the magnetic transitions during either a read or write operation. In a known servo system, servo position information is recorded on the disc surface between written data blocks, and periodically read by the head for use in a closed loop control of the voice coil motor to position the actuator arm. Such a servo arrangement is referred to as an embedded servo system.

In modern disc drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disc drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

Each servo sector also contains encoded information to uniquely identify the specific track location of the head. For example, each track can be assigned a unique number, which is encoded using a Gray code and recorded in each servo sector of the track. The Gray code information is used in conjunction with the servo bursts to control movement of the actuator arm when the arm is moving the head in a seek operation from a current track to a destination track containing a data field to be read or written.

The head structure also includes a slider having an air bearing surface that causes the transducer to fly above the data tracks of the disc surface due to fluid currents caused by rotation of the disc. Thus, the transducer does not physically contact the disc surface during normal operation of the disc drive to minimize wear at both the head and disc surface. The amount of distance that the transducer flies above the disc surface is referred to as the "fly height." By maintaining the fly height of the head at an even level regardless of the radial position of the head, it is ensured that the interaction of the head and magnetic charge stored on the media will be consistent across the disc.

When writing or reading information, the hard disc drive may perform a seek routine to move the transducers from one cylinder (track) to another cylinder. During the seek routine the voice coil motor is excited with a current to move the transducers to the new cylinder location on the disc surfaces. The controller also performs a servo routine to insure that the transducer moves to the correct cylinder location, and is at the center of the track.

Many disc drives utilize a "model reference" control algorithm to move the transducer to the correct location in the shortest amount of time. An example of the waveform for seek routines that utilize model reference control theory is provided in FIG. 1. As shown in FIG. 1, the waveform has an initial acceleration phase, illustrated as being the positive square wave portion between t0 and ta, with ta being the time at the end of the acceleration state. During this phase, a constant acceleration current is applied to the voice coil motor to cause it to accelerate the assembly.

Following the initial acceleration phase, there is a coast phase in which there is no current applied, illustrated in FIG. 1 as the period between ta and tc, where tc is the time at the end of the coast state. During this phase of operation, the voice coil motor does not generate any further acceleration of the assembly and it is allowed to coast as part of the seek operation. Following the coast phase, there is a deceleration phase illustrated as the period between tc and tf, where tf is the final time of the seek operation. During this phase of operation, a deceleration current is applied to the voice coil motor which causes the assembly to reduce its speed down to zero.

Because these conventional model reference seek models include the coast phase, such seeks typically require more time than would otherwise be necessary if the coast phase were able to be removed. However, there is no known approach that provides a feasible way to remove the coast phase of the model reference seek without introducing undesirable affects including high frequency harmonics which stimulate mechanical resonance and excite mechanical components or assemblies with high natural frequencies.

In order to reduce the amount of time for a seek operation, a "bang-bang" control algorithm may be utilized to move the transducer to the correct location in the shortest amount of time. As discussed in U.S. Pat. No. 6,549,364, for example, the shape of such a waveform generated using a "bang-bang" control algorithm is a square waveform. Unfortunately, square waveforms contain high frequency harmonics which stimulate mechanical resonance in the hard drive assembly and excited mechanical components which high natural frequencies. This results in acoustic noise, undesirable vibration, and associated settling time due to residual vibration. The mechanical resonance created by the square waveforms of tend to increase both the settling and overall time required to write data or read information from the disc.

The present invention provides a solution to this and other problems, and offers other advantages over previous solutions.

SUMMARY OF THE INVENTION

The present invention provides a method and apparatus for improving the timing of a seek operation through the removal of the coast phase of conventional model reference waveform type control systems. With the present invention, the coast phase is removed such that an acceleration phase is immediately followed by a deceleration phase in the waveform of the control system. A [(1-cosine)/2] shaping is applied to the resulting square waveform so that the affects of high frequency harmonics are minimized.

The result of the cosine bang-bang waveform used by the present invention is that a reduction in seek time is achieved. In addition, with previous model reference (MR) seeks, tables are used for calculating a feed forward signal for the control algorithm for each seek length. After a certain seek length, the table is too large to be stored in the memory of the controller and, as a result, a velocity mode seek, which does not require a table, is used. With the present invention, the feed forward control signals are generated "on-the-fly" and thus, eliminate the need for stored tables. Therefore, the present invention can be used to extend the seek length compared to the MR seeks.

In addition to the above, the present invention provides a controller architecture in which the cosine bang-bang waveform may be applied as a feed forward excitation to a voice coil motor to control the actuation of the read/write heads of a disc drive. With the controller architecture of the present invention, the low-pass filters required in a model reference waveform approach are eliminated in favor of 1-cosine shaping of the square waveform of the present invention. As a result, the increased time requirement due to low pass filtering is eliminated in the controller of the present invention.

These and various other features as well as advantages which characterize the present invention will be apparent upon reading of the following detailed description and review of the associated drawings.

DETAILED DESCRIPTION

The present invention is directed to a mechanism for generating a control waveform for controlling the operation of a voice coil in a disc drive apparatus. As such, in order to provide a context in which the present invention may be implemented, a brief description of the disc driver apparatus is provided with reference to FIGS. 2 and 3.

Figure 2:
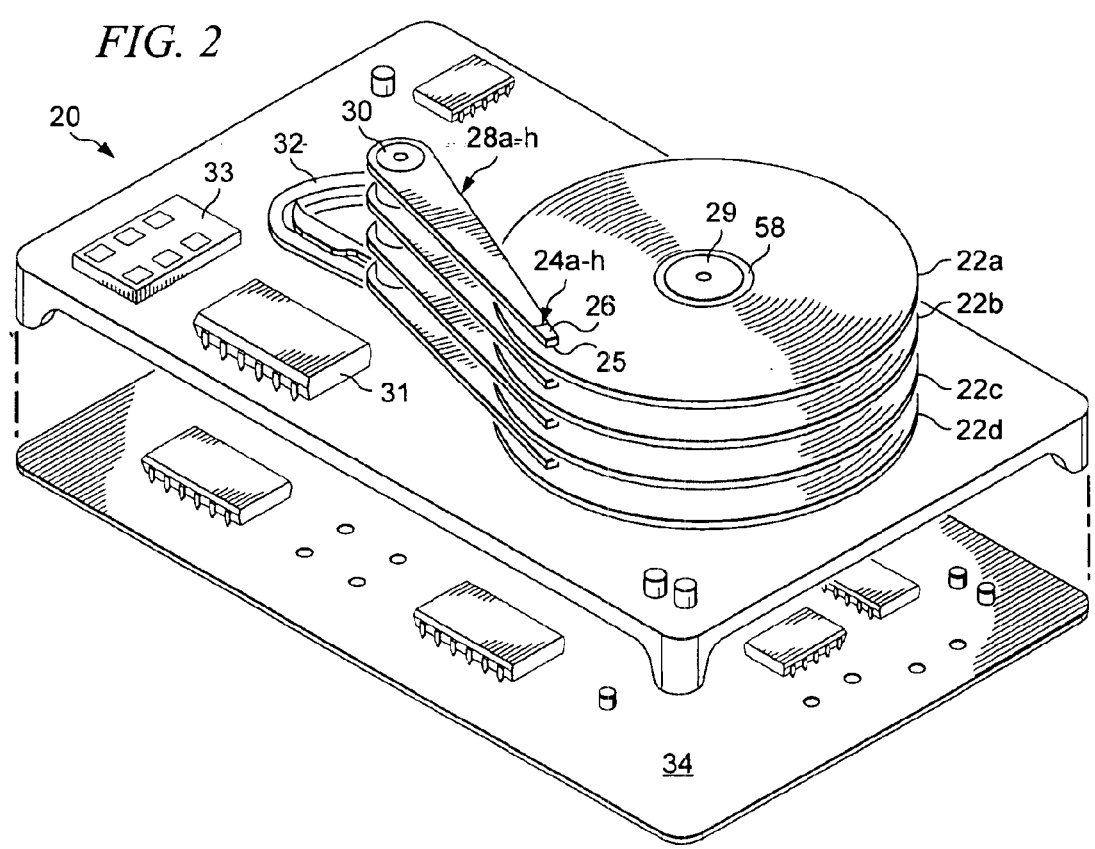
FIG. 2 is an exemplary diagram of a disc drive in accordance with the present invention.

Referring now to the drawings, and initially to FIG. 2, there is illustrated an example of a disc drive designated generally by the reference numeral 20. The disc drive 20 includes a stack of storage discs 22a–d and a stack of read/write heads 24a–h. Each of the storage discs 22a–d is provided with a plurality of data tracks to store user data. As illustrated in FIG. 2, one head is provided for each surface of each of the discs 22a–d such that data can be read from or written to the data tracks of all of the storage discs. The heads are coupled to a pre-amplifier 31. It should be understood that the disc drive 20 is merely representative of a disc drive system utilizing the present invention and that the present invention can be implemented in a disc drive system including more or less storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage discs 22a–d. The manner for coupling the PCB 34 to the various components of the disc drive is well known in the art, and includes a connector 33 to couple the read/write channel circuitry to the pre-amplifier 31.

Figure 3:
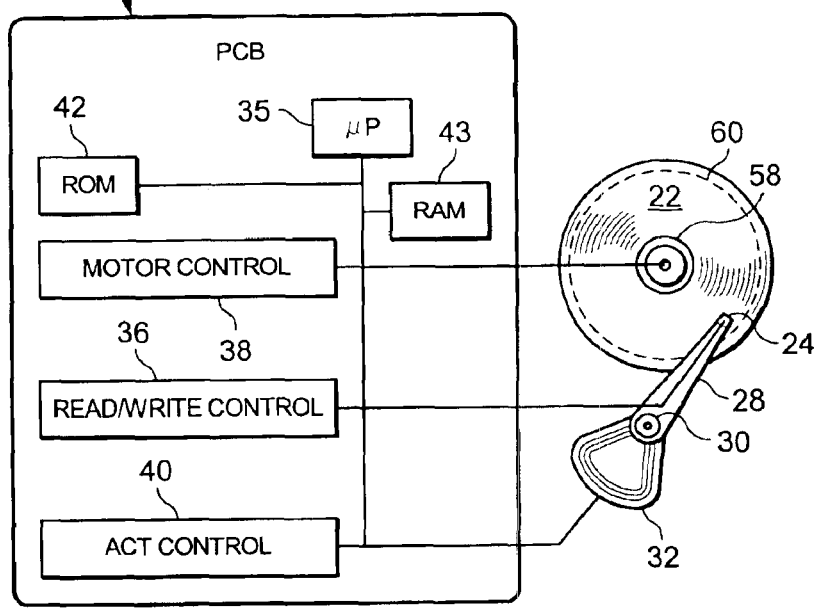
FIG. 3 is an exemplary block diagram of a printed circuit board and its electrical couplings in accordance with the present invention.

Referring now to FIG. 3, there is illustrated in schematic form of the PCB 34 and the electrical couplings between the control electronics on the PCB 34 and the components of the disc drive system described above. A microprocessor 35 is coupled to each of a read/write control 36, spindle motor control 38, actuator control 40, ROM 42 and RAM 43. In modern disc drive designs, the microprocessor can comprise a digital signal processor (DSP). The microprocessor 35 sends data to and receives data from the storage discs 22a–d via the read/write control 36 and the read/write heads 24a–h.

The microprocessor 35 also operates according to instructions stored in the ROM 42 to generate and transmit control signals to each of the spindle motor control 38 and the actuator control 40. The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and radial speed of the read/write heads 24a–h.

When data to be written or read from one of the storage discs 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of the read/write control 36 for processing via the pre-amplifier 31. The RAM 43 can be used to buffer data read from or to be written to the data sectors of the storage discs 22a–d via the read/write control 36. The buffered data can be transferred to or from a host computer utilizing the disc drive for data storage.

As previously mentioned, the present invention provides a mechanism for improving the timing of seek operations in a disc drive by eliminating the coast state of a model reference seek. The present invention provides a feed-forward controller with a reference model for controlling the operation of a voice coil motor 32 so as to provide a quicker seek time than is achievable in known model reference seek operations. As such, the present invention may be implemented in the actuator control 40 of the printed circuit board 34 show in FIG. 3.

Returning to FIG. 1, as previously stated, known model reference seek waveforms require additional time to perform the seek operation because of the coast phase of the seek operation. It can be determined from the waveform depicted in FIG. 1 that the position and velocity of the read/write head at time ta is $$x(ta) = \tfrac{1}{2} A ta^2$$

$$v(ta) = A ta$$

The position and velocity at time tc is $$x(tc) = x(ta) + v(ta)[tc-ta] = 1/2 A ta^2 + A ta[tc-ta] = 3/2 A ta^2$$

$$v(tc) = v(ta) = A ta$$

The position and velocity at time tf is $$x(tf) = x(tc) + v(tc)[tf - tc] + \frac{1}{2}(-A)[tf - tc]^2$$

$$= (3/2) A ta^2 + A ta^2 - \frac{1}{2} A ta 2$$

-continued $$= 2Ata^2$$

$$v(tf)=v(tc)-A[tf-tc]=Ata-Ata=0$$

Thus, from the above, it can be seen that x(tf), i.e. the seek length, is determined from the following equation:

Seek Length=$2*AT^2$ where A is the approximate acceleration and T is the number of samples in a sampling period ts in time ta. That is T=ta/ts where ts is the sampling period. Although ta/ts can be a fractional number, an integer value of T is used by the present invention, as discussed hereafter.

The approximate acceleration is determined based on the given seek length and is used to determine is obtained using the following equation:

A=minimum_A+SeekLength*Slope where minimum_A is a minimum acceleration of the actuator, seek length is a given parameter identifying the number of tracks to be traversed by the actuator, and the slope is a tuning parameter.

As a result, the number of samples during acceleration, T, may be determined based on the given seek length and the approximate acceleration as:

T=floor (sqrt(Seeklength/(2*A)))

and since T must be an integer in the sampled data system, the acceleration A may be recalculated to adjust for the fractional time lost as follows:

A=(Seeklength/$2*T^2$)

It is desirable to minimize the amount of time required to write data to and read information from the disc(s) of a disc drive. Therefore, the seek routine performed by the disc drive should move the transducers to the new cylinder location in the shortest amount of time. Additionally, the settling time of the hard drive assembly should be minimized so that the transducer can quickly write or read information, once located adjacent to the new cylinder.

Simply programming the controller to apply a waveform in which the coast phase of the model reference waveform is eliminated does not achieve the desired functionality. That is, when the coast phase is removed from the model reference waveform, an acceleration phase is immediately followed by a deceleration phase and a square waveform is created. Unfortunately, square waveforms contain high frequency harmonics which stimulate mechanical resonance and excite mechanical components or assemblies with high natural frequencies. This results in acoustic noise, undesirable vibration, and associated settling time due to residual vibration. The mechanical resonance created by square waveforms tends to increase both the settling and overall time required to write data to or read information from the disc.

In order to provide the quickest seek time, the present invention eliminates the coast phase of the model reference seek operation and then applies (1-cosine)/2 shaping to the resulting waveform. The (1-cosine)/2 shaping is applied to all three edges of the square waveform, not just one, i.e. zero current to the acceleration, acceleration to deceleration transition, and deceleration to arrival transition. As a result, the problems associated with square waveforms are minimized through (1-cosine)/2 shaping while still achieving the improvement in seek time that is desirable. The resulting seek operation using a waveform in which the coast phase has been removed and the resulting square waveform is shaped using (1cosine)/2 shaping is termed the "cosine bang-bang" seek operation.

Figure 4:
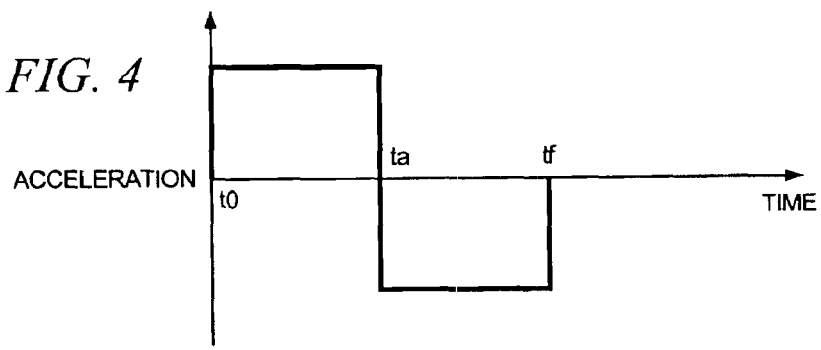
FIG. 4 is an exemplary diagram illustrating a cosine bang-bang seek waveform according to the present invention.

FIG. 4 illustrates an exemplary square waveform used with the cosine bang-bang seek mechanism of the present invention. As shown in FIG. 4, at time t0 the position of the read/write heads of the disc drive is X(t0)=0 and the velocity of the read/write heads of the disc drive is V(t0)=0. At time ta, i.e. after acceleration, the position of the read/write heads of the disc is x(ta)=½ Ata2 and the velocity is Ata. At time tf, i.e. after deceleration, the position and velocity of the read/write heads is:

$x(tf)=x(ta)+v(ta)[tf-ta]-½ Ata^2-½ Ata^2=Ata^2$ $v(tf)=v(ta)-Ata=v(ta)-v(ta)=0$

From these equations it can be determined that the seek length is x(tf) or $AT^2$. The time period for acceleration and the acceleration are found by the equations:

T=floor (sqrt(Seeklength/A))

A=(Seeklength/$T^2$)

Thus, by being able to remove the coast phase, the cosine bang-bang seek of the present invention allows the velocity to reach up higher, for the same seek length, thereby reducing the overall seek time. This is achieved by feeding in higher excitation current than the conventional model reference seeks.

Figure 5:
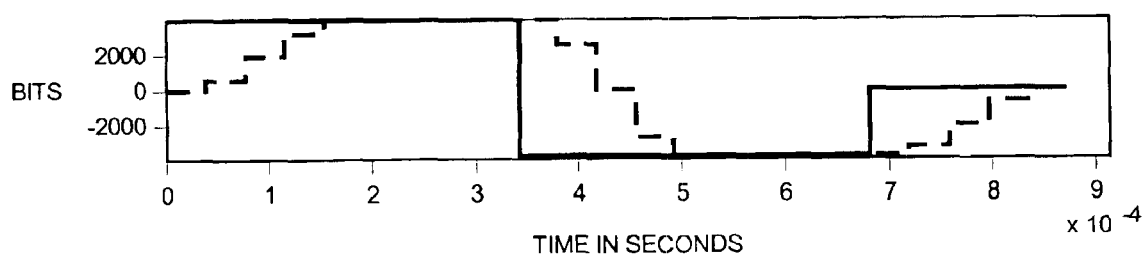
FIG. 5 is an exemplary diagram illustrating a comparison of a square waveform and a 1-cosine shaped square waveform in accordance with the present invention.

As mentioned previously, one cannot simply apply a square waveform such as that shown in FIG. 4 without introducing undesirable effects into the disc drive assembly. Therefore, in order to minimize the effects of the high frequency harmonics of square waveforms, the present invention shapes the square waveform of FIG. 4 using (1-cosine)/2 shaping. A comparison of the resulting cosine bang-bang waveform and the square waveform is provided in FIG. 5. As shown in FIG. 5, the square waveform takes approximately $6.75 \times 10^{-4}$ seconds and the (1-cosine)/2 shaped square waveform take approximately $8.75 \times 10^{-4}$ seconds to accomplish the seek operation but the (1-cosine)/2 shaped waveform does not have the large transitions of the non-shaped square waveform. Since, the large transitions of the square waveform are lessened through (1-cosine)/2 shaping, the affects of high frequency harmonics are reduced. Moreover, as will be discussed in greater detail hereafter, the present invention allows for the elimination of low pass filters, as are used in conventional MR seek configurations, and thus, a performance improvement is obtained that offsets the performance losses due to the (1-cosine)/2 shaping.

Figure 6:
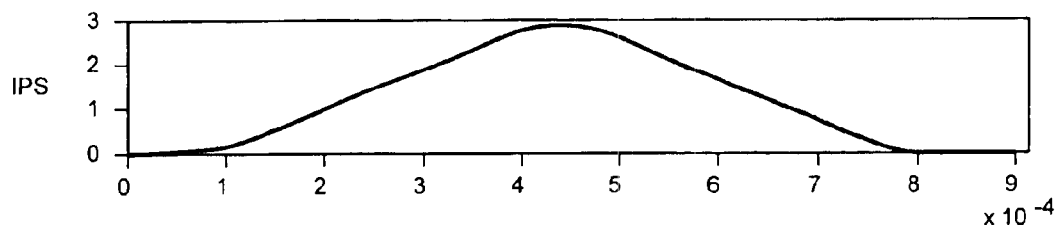
FIG. 6 is an exemplary diagram illustrating a velocity profile achieved by use of the 1-cosine shaped square waveform of the present invention.

FIG. 6 illustrates an exemplary velocity profile achieved through use of the (1-cosine)/2 shaped waveform. As shown in FIG. 6, the velocity profile is a smooth curve that transitions from 0 inches per second (IPS) through to approximately 2.9 IPS and back to 0 IPS in approximately $8.75 \times 10^{-4}$ ms. As can be seen from the velocity profile, there is no coast period in the velocity profile. Rather, there is a smooth transition from an acceleration phase to a deceleration phase.

Figure 7:
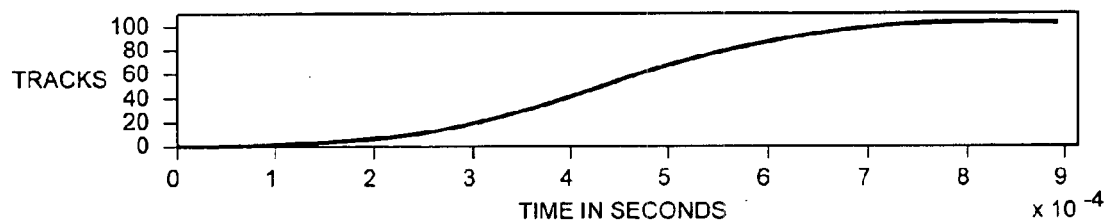
FIG. 7 is an exemplary diagram of a position profile achieved by use of the 1-cosine shaped square waveform of the present invention.

FIG. 7 illustrates an exemplary position profile achieved through the use of the (1-cosine)/2 shaped waveform. As shown in FIG. 7 the position starts from a 0 track position and has a smooth transition from track 0 to track 100 at approximately $8 \times 10^{-4}$ seconds.

In addition to reducing the time required to perform a seek operation by removing the coast phase of the model reference waveform, the present invention also improves timing of a seek operation by removing the need to perform low pass filtering of the model reference waveform. Low pass filtering is used in the model reference waveform to lessen the affects of sharp edges in the waveform. This low pass filtering, however, increases the amount of time required to complete the seek operation.

Instead, the present invention performs (1-cosine)/2 shaping of the square waveform of the present invention and thus, low pass filtering is not necessary to remove sharp edges of the model reference waveform. As a result, the time delay associated with performing low-pass filtering in the controller architecture based on the model reference waveform is eliminated by the present invention. The difference in controller architectures between the model reference waveform controller architecture and the cosine bang-bang waveform controller architecture is best understood by reference to FIGS. 8 and 9.

Figure 1:
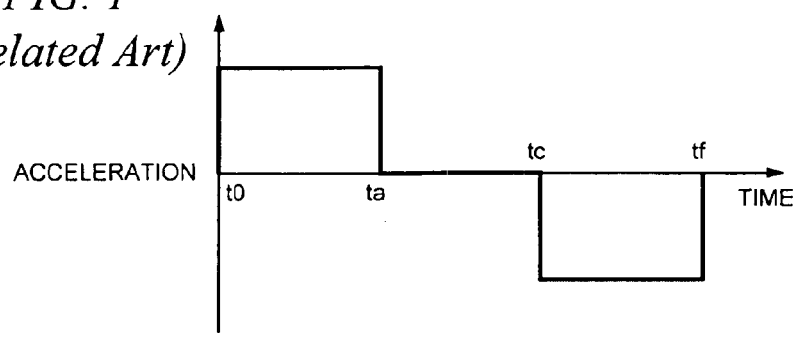
FIG. 1 is an exemplary diagram illustrating a conventional model reference seek waveform.
Figure 8:
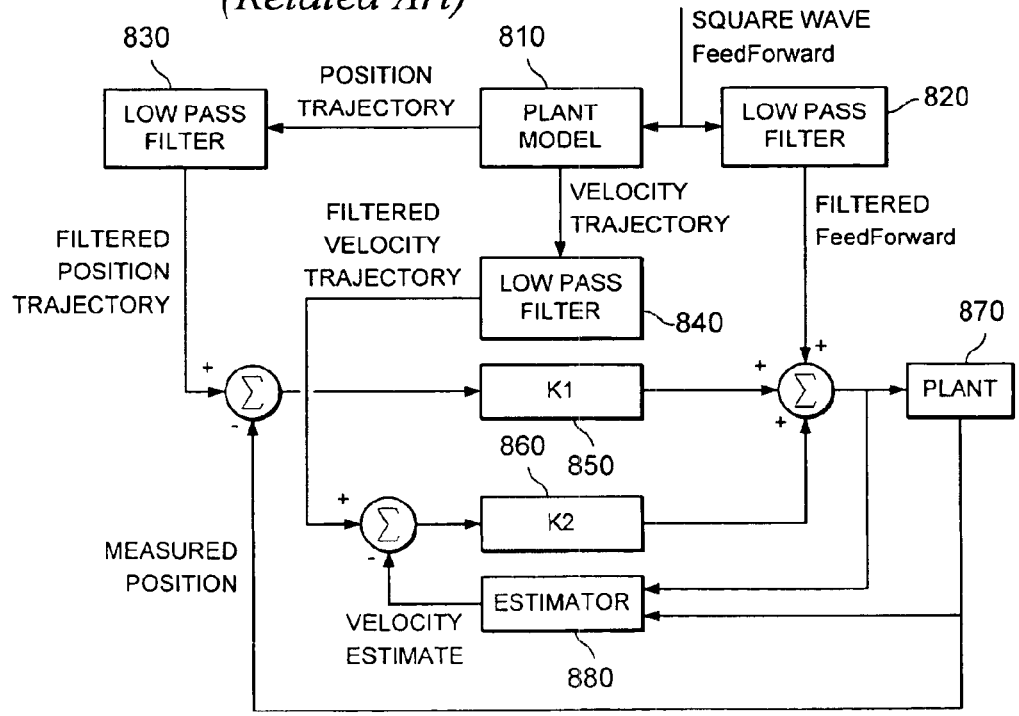
FIG. 8 is an exemplary block diagram of a controller implementing the known model reference control waveform.

FIG. 8 is an exemplary block diagram of a controller implementing the known model reference control waveform. As shown in FIG. 8, a square waveform such as that shown in FIG. 1 is input to the plant model 810 and a first low pass filter 820. The plant model 810 is a model, such as a plurality of equations, that represent how the position and velocity of a hard disc drive actuator would change if the feed-forward signal is given to an ideal actuator in an ideal world. The plant model 810 generates a position trajectory signal and a velocity trajectory signal based on the input waveform. The position trajectory signal is sent to a second low pass filter 830 and the velocity trajectory signal is sent to a third low pass filter 840. The filtered position trajectory signal is used as reference signal. When the actual position signal from the plant 870 is subtracted from it, an error signal is generated which is input to amplifier 850. The amplifier 850 amplifies the difference signal by a gain K1.

The velocity error signal is generated by subtracting the estimated velocity from the velocity reference trajectory. The velocity estimate signal is obtained from estimator 880 based on a measured position signal received from plant 870 and the output control signal generated by the controller. The output control signal generated by the controller and sent to the plant 870 is a sum of the filtered feed forward signal from low pass filter 820, the amplified position difference signal from amplifier 850, and an amplified velocity difference signal generated by amplifier 860.

Thus, as can be seen from FIG. 8, three difference low pass filters are required for ensuring that the frequency of the position trajectory, velocity trajectory and feed forward control signals are the same. These low pass filters represent a source of delay in the control of the plant 870. The present invention eliminates the delay associated with these low pass filters.

Figure 9:
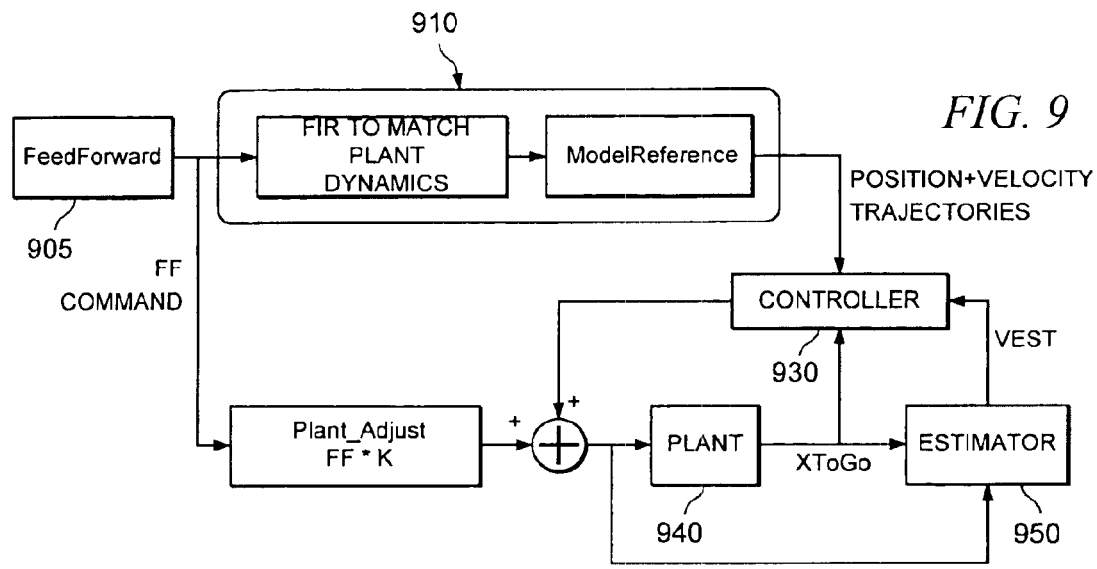
FIG. 9 is an exemplary diagram illustrating a comparison between a conventional model reference feed forward profile and the cosine bang-bang feed forward profile of the present invention.

FIG. 9 is an exemplary diagram illustrating a comparison between a conventional model reference feed forward profile and the cosine bang-bang feed forward profile of the present invention. As shown in FIG. 9, the present invention includes inputting a waveform, such as that shown in FIG. 4, which is modified by (1-cosine)/2 shaping, as a feed forward signal waveform to a plant model 910. The (1-cosine)/2 shaped waveform is generated by the feedforward device 905.

In addition, the (1-cosine)/2 shaped square waveform is input to the plant adjustment device 920 which applies an adjustment to the feed forward waveform signal to overcome the plant imperfections that cannot be modeled in the plant model 940. This adjustment also allows the cosine bang-bang seek controller to be tuned for each and every hard disc drive separately and automatically.

The plant model 910 generates position and velocity trajectories based on a model of the operation of the plant. These velocity and position trajectories are input to the controller 930 directly without having to be passed through a low pass filter. The controller 930 determines a control signal based on the measured position output of the plant 940 and one or more of an estimated velocity and an estimated position of the plant 940 obtained from the estimator 950. The control signal is summed with the output from the plant adjustment device 920 to generate a control signal that is sent to the plant 940, via an interface or electrical connection (not shown), to control the operation of the plant.

With the present invention, the plant model 910 applies 1-cosine shaping to the feed forward input signal received such that appropriate velocity and position trajectories are obtained. Because the feed forward waveform signal is shaped using (1-cosine)/2 shaping, there is no need for low pass filtering of the position and velocity trajectories output by the plant model 910. This is because the shaped waveform feeds excitation at only one selected frequency. The cosine frequency is selected as a part of the tuning process and normally is below the main resonance frequencies. The square waveform edges approaches have infinite number of frequencies in it, which would excite all the possible resonances.

Through the use of the cosine bang-bang controller illustrated in FIG. 9, improved seek performance is achieved. That is, the time required to perform a seek operation is reduced. Since the cosine bang-bang seek calculations for calculating the feed forward signal and the seek time for a given seek length are relatively simple, they are performed on-the-fly for each seek instead of using memory tables. This feature enables usage of cosine bang-bang seeks for much longer seek lengths than was possible for model reference seek lengths with pre-calculated memory tables. As a result, there is more time savings with longer seek lengths.

Figure 10:
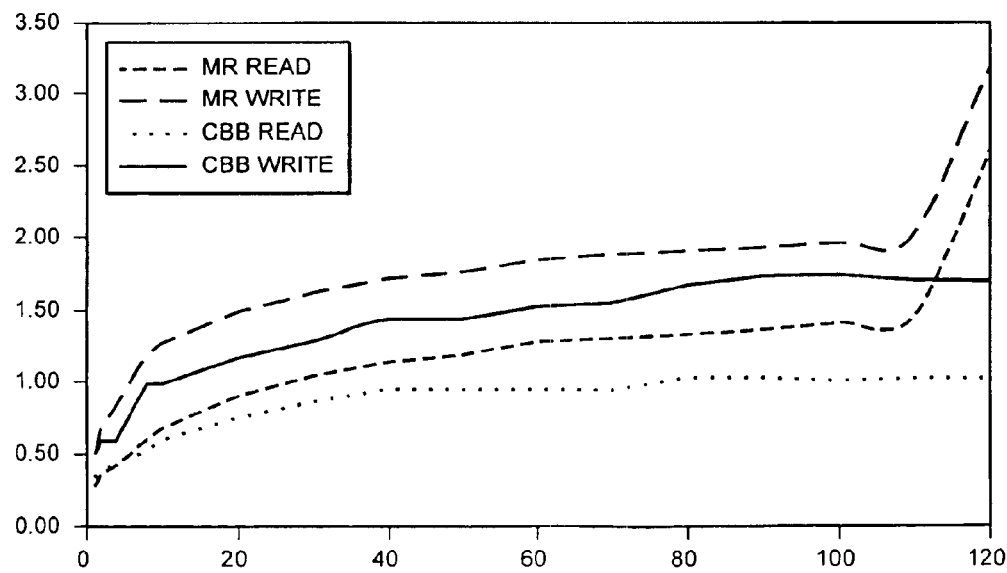
FIG. 10 is an exemplary diagram illustrating exemplary seek performance comparisons between a conventional model reference seek and the cosine bang-bang seek of the present invention.

FIG. 10 is an exemplary diagram illustrating exemplary seek performance comparisons between a conventional model reference seek and the cosine bang-bang seek of the present invention. As shown in FIG. 10, there is an improvement in the seek times for both read and write operations using the cosine bang-bang methodology of the present invention. As illustrated, there is approximately between a 0.3 to 0.4 ms improvement in seek time for cosine bang-bang write operations when compared to conventional model reference write operations. Similarly, there is approximately between a 0.2 and 0.4 ms improvement in seek time for cosine bang-bang read operations when compared to conventional model reference read operations.

Also illustrated in FIG. 10, when the number of tracks involved in the seek operation exceeds approximately 110–120 tracks, there is an exponential increase in the seek times for read and write operations using conventional waveform control. This is because above 110–120 tracks, a slower algorithm called the velocity mode seek is necessary due to the size of the tables required in the model reference control algorithm becoming too large. However, with the cosine bang-bang control of the present invention, the seek time stabilizes such that there are minimal increase, if any, for seek lengths in a period of between 110 to 120 tracks. This allows for larger seek lengths than is practically achievable using conventional model reference waveform control.

Figure 11:
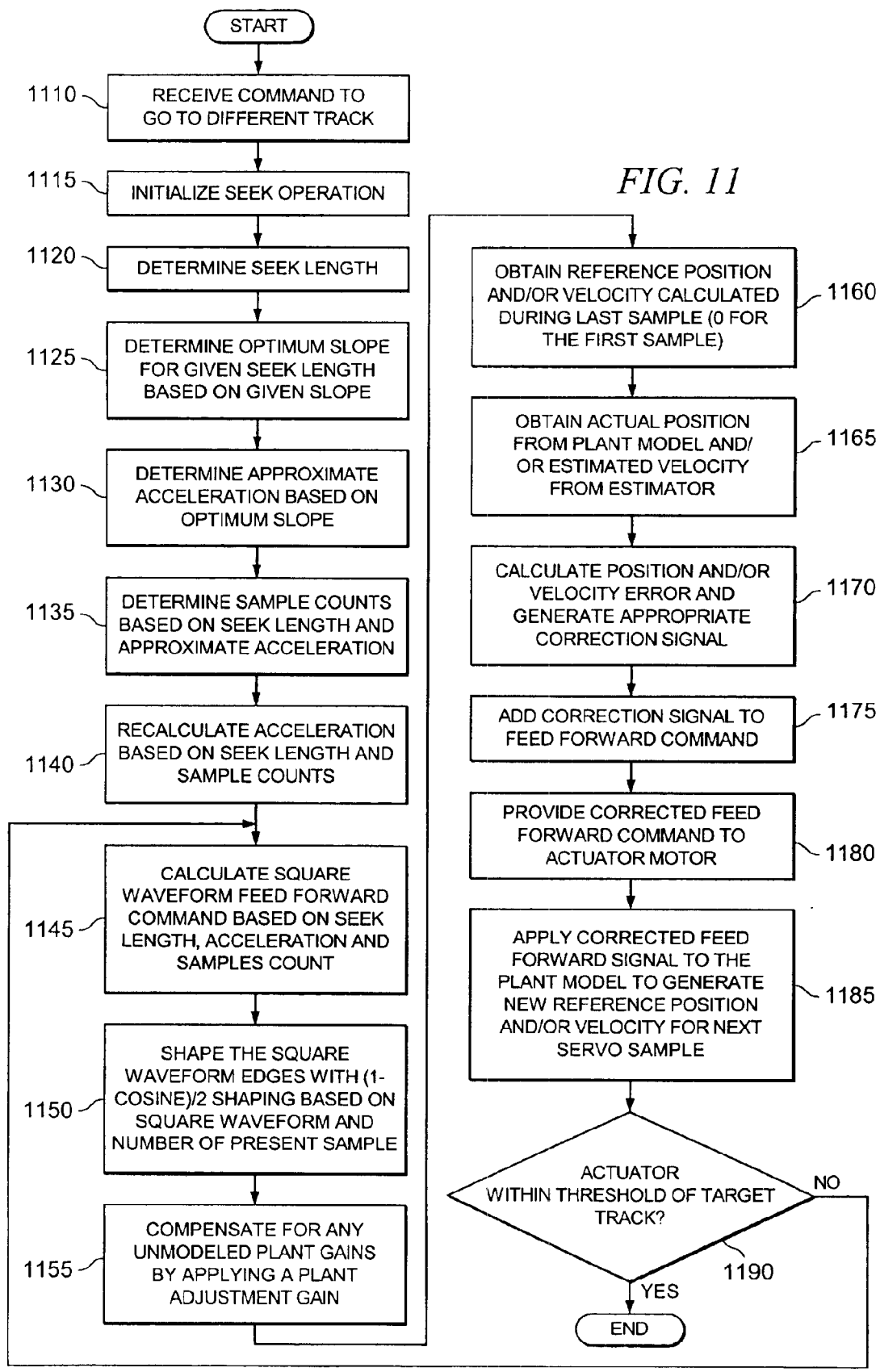
FIG. 11 is a flowchart outlining an exemplary operation of the present invention when performing a seek.

FIG. 11 is a flowchart outlining an exemplary operation of the present invention when performing a seek operation. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 11, the operation starts by receiving a command to go to a different track of the hard disc (step 1110). The seek operation is then initialized (step 1115) and a seek length is determined (step 1120). The optimum slope for a given seek length based on a give slope is determined (step 1125). An approximate acceleration of the actuator is then determined based on the optimum slope (step 1130). A sample count is determined based on the seek length and the approximate acceleration (step 1135) and the acceleration is then recalculated, referred to hereafter as the "feedforward acceleration", based on the seek length and sample counts (step 1140) to compensate for fractional losses.

A square waveform feed forward command is calculated based on the seek length, acceleration and samples count (step 1145). The edges of the square waveform are then shaped using the (1-cosine)/2 shaping based on a square waveform and number of the present sample (step 1150). In one exemplary embodiment of the present invention, "shaping" the waveform involves calculating the shaped waveform using the following equation:

Shaped waveform=FeedForward_Acceleration*(1-Cos(2*pi*Cosine_Frequency*# of Sample))/2

Here, depending on the frequency selected, (1Cos (2*pi*cosine_frequency*# of samples) becomes equal to 1 after a few samples, i.e. when 2*cosine_frequency*# of sample=1, Cos(pi)=−1→1Cos(pi)=2)→(1-Cos(pi))/2=1). fter a few (say 3,5,7 or preferably an odd number of samples, although it is not necessary) samples. After these number of samples (which is known to the seek tuner based on his/her frequency selection), e.g., 3, 5, 7 or preferably an odd number of samples, although it is not necessary that the number of samples be odd, the shaping part of the waveform is done and constant FeedForward_acceleration is applied till the acceleration phase is over. A similar technique may be applied for shaping acceleration to deceleration phase and for deceleration to the arrival phase.

After shaping the waveform, any unmodeled plant gains are then compensated for by applying a plant adjustment gain (step 1155). A reference position and/or velocity are then obtained for the last sample (step 1160). An actual position is obtained from the plant model and/or an estimated velocity is obtained from an estimator (step 1165). A position and/or velocity error are then calculated to generate an appropriate correction signal (step 1170). The correction signal is then added to the (1-cosine)/2 shaped waveform feed forward command which is (step 1175). The corrected feed forward command signal is then provided to the actuator to thereby control the movement of the actuator motor. (step 1180). The (1-cosine)/2 shaped feed forward command is also provided to the plant model to generate a new reference position and/or velocity for use with the next voice coil motor sampling (step 1185). A determination is made as to whether the actuator is within a threshold of the target track (step 1190). If so, the operation terminates. Otherwise, the operation returns to step 1145 for continued processing with the next actuator voice coil motor sampling.

Thus, the present invention provides a mechanism by which a seek time for performing a seek operation in a hard disc drive is reduced by eliminating a coast phase of conventional model reference seek operations. The resulting "bang-bang" seek operation is performed such that an acceleration phase is immediately followed by a deceleration phase and thus, the seek timing is reduced. In addition, the present invention provides for (1-cosine)/2 shaping of the resultant square waveform so that the "bang-bang" seek operation may be performed without experiencing the undesirable effects associated with acoustic noise, undesirable vibration, and associated settling time due to residual vibration.

As illustrated by the exemplary embodiments above, the present invention provides a method and apparatus for controlling a voice coil motor in a disc drive during a seek operation. The method and apparatus provide a mechanism for generating a square waveform command signal for controlling the operation of the voice coil motor based on a square waveform, the square waveform having an acceleration phase immediately followed by a deceleration phase. The square waveform command signal is shaped using (1-cosine)/2 shaping to thereby generate a shaped waveform command signal and a control signal is generated based on the shaped waveform command signal. This control signal is output to the voice coil motor.

The square waveform command signal may be generated, for example, by determining a seek length of the seek operation, determining an acceleration of the seek operation, and generating the square waveform command signal based on the seek length and acceleration. The acceleration may be determined, for example, by determining an optimum slope for the square waveform, determining an approximate acceleration based on the optimum slope, determining a sample count based on the seek length and approximate acceleration, and calculating the acceleration based on the seek length and sample count.

In addition to the above, a plant adjustment signal may be generated and summed with the control signal to generate a resultant signal which is output to the voice coil motor to thereby control the voice coil motor. This plant adjustment signal helps to adjust for discrepancies between the plant model and the actual plant operation. It is possible to calibrate this signal for each and every drive. This can be combined with plant reference model calibration to obtain optimized seek performance for each and every drive during manufacturing.

In generating the control signal, at least one of a reference position and a reference velocity may be determined along with at least one of an actual position and an estimated velocity. The reference position and velocity may be determined from a plant model that models the operation of an actuator of a read/write head mechanism, for example. The estimated velocity may be obtained from an estimator associated with a controller of the present invention.

Based on the reference position and velocity and the actual position and estimated velocity, at least one of a position error and a velocity error may be determined based on the reference position, reference velocity, actual position and estimated velocity. A correction signal may then be generated based on one of the position error and the velocity error and added to the shaped waveform command signal to thereby generate the control signal.

In one exemplary embodiment, the approximate acceleration is determined using the following equation:

$$A=\text{Minimum\_}A+(\text{slope}*\text{minimum}(\text{SeekLength, Maximum SeekLength})$$

where A is the approximate acceleration, Minimum_A is a minimum acceleration value for the seek operation, slope is the determined optimum slope, SeekLength is the determined seek length for the seek operation, and Maximum SeekLength is a maximum seek length for the seek operation. Moreover, the sample count may be determined based on the following equation:

$$\text{sample\_count}=\text{truncated}(\text{sqrt}(\text{SeekLength}/A))$$

where sample_count is the sample count, SeekLength is the determined seek length, and A is the approximate acceleration.

In still other exemplary embodiments, the control signal is generated without using low-pass filtering and thus, the performance degradation obtained from using low-pass filtering is avoided. In addition, the method and apparatus may be implemented in an actuator control portion of a printed circuit board of the disc drive.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of controlling a motor, comprising:

generating a square waveform command signal for controlling the operation of the motor based on a square waveform, wherein the square waveform comprises an acceleration phase immediately followed by a deceleration phase;

shaping the square waveform command signal using (1-cosine)/2 shaping to thereby generate a shaped waveform command signal;

generating a control signal based on the shaped waveform command signal; and outputting the control signal to the motor.

2. The method of claim 1, wherein generating the square waveform command signal includes:

determining a seek length;

determining an acceleration; and generating the square waveform command signal based on the seek length and acceleration.

3. The method of claim 2, wherein determining the acceleration includes:

determining an optimum slope for the square waveform;

determining an approximate acceleration based on the optimum slope;

determining a sample count based on the seek length and approximate acceleration; and calculating the acceleration based on the seek length and sample count.

4. The method of claim 3, wherein the approximate acceleration is determined using the following equation:

$$A=\text{Minimum\_}A+(\text{slope}*\text{minimum}(\text{SeekLength, Maximum SeekLength})$$

where A is the approximate acceleration, Minimum_A is a minimum acceleration value for the seek operation, slope is the determined optimum slope, SeekLength is the determined seek length for the seek operation, and Maximum SeekLength is a maximum seek length for the seek operation.

5. The method of claim 3, wherein the sample count is determined based on the following equation:

$$\text{sample\_count}=\text{truncated}(\text{sqrt}(\text{SeekLength}/A))$$

where sample_count is the sample count, SeekLength is the determined seek length, and A is the approximate acceleration.

6. The method of claim 1, further comprising:

generating a plant adjustment signal;

summing the plant adjustment signal with the control signal to generate a resultant signal; and outputting the resultant signal to the motor to thereby control the motor.

7. The method of claim 1, wherein generating the control signal includes:

determining at least one of a reference position and a reference velocity;

determining at least one of an actual position and an estimated velocity;

determining at least one of a position error and a velocity error based on the reference position, reference velocity, actual position and estimated velocity;

generating a correction signal based on one of the position error and the velocity error; and adding the correction signal to the shaped waveform command signal to thereby generate the control signal.

8. The method of claim 7, wherein the reference position and reference velocity are determined by applying the shaped waveform command signal to a model that approximates the operation of the motor.

9. The method of claim 1, wherein generating the control signal is performed without using low-pass filtering.

10. The method of claim 1, wherein the motor is a voice coil motor, and the method is for a seek operation in a storage device.

11. An apparatus for controlling a motor, comprising:

a feedforward device; and a controller coupled to the feedforward device, wherein the feedforward device generates a square waveform command signal for controlling the operation of the motor based on a square waveform, wherein the square waveform comprises an acceleration phase immediately followed by a deceleration phase, and shapes the square waveform command signal using (1-cosine)/2 shaping to thereby generate a shaped waveform command signal, and wherein the controller generates a control signal based on the shaped waveform command signal and outputs the control signal to the motor.

12. The apparatus of claim 11, wherein the feedforward device generates the square waveform command signal by:

determining a seek length;

determining an acceleration; and generating the square waveform command signal based on the seek length and acceleration.

13. The apparatus of claim 12, wherein the feedforward device determines the acceleration by:

determining an optimum slope for the square waveform;

determining an approximate acceleration based on the optimum slope;

determining a sample count based on the seek length and approximate acceleration; and calculating the acceleration based on the seek length and sample count.

14. The apparatus of claim 13, wherein the feedforward device determines the approximate acceleration using the following equation:

$$A = \text{Minimum}\_A + (\text{slope} * \text{minimum}(\text{SeekLength}, \text{Maximum SeekLength})$$

where A is the approximate acceleration, Minimum_A is a minimum acceleration value for the seek operation, slope is the determined optimum slope, SeekLength is the determined seek length for the seek operation, and Maximum SeekLength is a maximum seek length for the seek operation.

15. The apparatus of claim 13, wherein the feedforward device determines the sample count based on the following equation:

$$\text{sample\_count} = \text{truncated}(\text{sqrt}(\text{SeekLength}/A))$$

where sample_count is the sample count, SeekLength is the determined seek length, and A is the approximate acceleration.

16. The apparatus of claim 11, further comprising:

a plant adjustment device that generates a plant adjustment signal based on the shaped waveform command signal; and a summation device that adds the plant adjustment signal to the control signal to generate a resultant signal, wherein the resultant signal is output to the motor to thereby control the motor.

17. The apparatus of claim 11, further comprising:

a plant model that determines a reference position of a read/write head; and a measurement device for measuring an actual position of the read/write head, wherein the controller determines a position error based on the reference position and the actual position, generates a correction signal based on one of the position error, and adds the correction signal to the shaped waveform command signal to thereby generate the control signal.

18. The apparatus of claim 17, wherein the reference position is determined by applying the shaped waveform command signal to a model that approximates the operation of the motor.

19. The apparatus of claim 11, wherein the controller generates the control signal without using low-pass filtering.

20. The apparatus of claim 11, wherein the motor is a voice coil motor, and the apparatus is configured for a seek operation in a storage device.

* * * * *